United States Patent [19]
Abe

[11] Patent Number: 5,530,871
[45] Date of Patent: Jun. 25, 1996

[54] ASYNCHRONOUS INPUT AND OUTPUT CONTROL SYSTEM

[75] Inventor: Yasuhiro Abe, Hokkaido, Japan

[73] Assignee: NEC Corporation, Tokyo, Japan

[21] Appl. No.: 294,301

[22] Filed: Aug. 23, 1994

[30] Foreign Application Priority Data

Sep. 29, 1993 [JP] Japan ................... 5-241872

[51] Int. Cl.$^6$ ................................. G06F 13/30
[52] U.S. Cl. .................... 395/732; 395/250; 395/728; 395/478; 364/230.1; 364/242.8; 364/DIG. 1
[58] Field of Search .................. 395/325, 250, 395/425, 200, 732

[56] References Cited

U.S. PATENT DOCUMENTS

| | | | |
|---|---|---|---|
| 4,543,626 | 9/1985 | Bean et al. | 364/200.03 |
| 4,654,788 | 3/1987 | Boudreau et al. | 395/287 |
| 4,835,672 | 5/1989 | Zenk et al. | 395/478 |
| 4,875,224 | 10/1989 | Simpson | 375/371 |
| 4,920,486 | 4/1990 | Nielsen | 395/291 |
| 5,261,065 | 11/1993 | Urabe et al. | 395/600 |
| 5,353,416 | 10/1994 | Olson | 395/288 |
| 5,418,925 | 5/1995 | DeMoss et al. | 395/441 |

OTHER PUBLICATIONS

Tanebaum, "Modern Operating System", 1992 pp. 61–69, 74–89.
"Operating System A–VX", *NEC Technical Journal*, vol. 43, No. 7, NEC Corporation, 1990, pp. 103–108, by Kobayashi et al.

*Primary Examiner*—Parshotam S. Lall
*Assistant Examiner*—Kenneth R. Coulter
*Attorney, Agent, or Firm*—Young & Thompson

[57] ABSTRACT

Upon receipt of a write request to an external storage device 6 from a user program 1n, a control program 2 stores the data in a vacant area within an asynchronous input and output buffer group 31, and generates, when it is determined by examining an asynchronous input and output task management table 5 that there does not exist an asynchronous input and output execution task having a priority identical to the priority assigned to the user program 1n, an asynchronous input and output execution task having a priority in question. The asynchronous input and output execution task 4n having a priority identical to the priority of the user program 1n takes out the data from an asynchronous input and output buffer group 3 based on the storage location and the data size within the asynchronous input and output buffer group 31 delivered from the control program 2, and writes the data to the external storage device.

9 Claims, 2 Drawing Sheets

| ADDRESS FIELD | TASK STATUS FLAG |
|---|---|
| ADDRESS OF ASYNCHRONOUS I/O EXECUTION TASK WITH PRIORITY 1 | (0:WAITING,1:INACTIVATION) |
| ADDRESS OF ASYNCHRONOUS I/O EXECUTION TASK WITH PRIORITY 2 | 0 OR 1 |
| ≈ | ≈ |
| ADDRESS OF ASYNCHRONOUS I/O EXECUTION TASK WITH PRIORITY n | 0 OR 1 | ns
ASYNCHRONOUS INPUT AND OUTPUT CONTROL SYSTEM

BACKGROUND OF THE INVENTION

1. Field of the Invention

This invention relates to an asynchronous input and output (I/O) control system, and more particularly to an asynchronous I/0 control system in a data processing system which executes a parallel processing of a plurality of user programs having different processing priorities.

2. Description of the Related Art

A conventional asynchronous I/O control system is disclosed in a paper by Kobayashi et al. entitled "Operating System A–VX", in NEC Technical Journal, Vol. 43, No. 7, pp. 103–106, NEC Corporation, 1990.

The asynchronous I/O control system comprises a disk buffer pool which is an I/O buffer area for disk secured on a main storage device, an asynchronous I/O control part which writes data, written on the disk buffer pool by a write instruction issued by a user program, to the disk asynchronously with the write instruction issued by the user program, rather than immediately writing the data physically to the disk, and back-up memories which hold the contents of the disk buffer pool.

The conventional asynchronous I/O control system has an effect of improving the throughput of a series of write processings by asynchronously executing the issuance of a write instruction of a user program and the physical write processing of data to a disk by the asynchronous I/O control part as in the above.

In addition, in the conventional asynchronous I/O control system, there is a possibility that the data transferred from the user program together with the write instruction is held on the disk buffer pool for a certain period of time. Therefore, if a read instruction for the data is issued from another user program during the holding period, it is possible to transfer the data to the user program without carrying out the read processing from the disk, so that it has an effect that there is a possibility of improving the throughput of the read processing.

However, in the conventional asynchronous I/O control system, in spite of the fact that a CPU is assigned according to a set priority for a processing other than the input and output processing of a user program, a certain priority is assigned to the asynchronous I/O control part which carries out the input and output for a disk without reflecting the priority of the user program. Consequently, the conventional system has a problem in that the throughput of overall user programs is not fully improved according to the priority.

Moreover, in the conventional asynchronous I/O control system, user programs having high priorities are preferentially executed so that data read or written by these user programs with high priorities are accumulated in the data buffer pool. As a result, when a user program having low priority data that has already been read once, the issues a read instruction again to the same data, there arises a case in which the data buffer pool used last time is carried off by another user program with higher priority and the data expected to be stored in the data buffer pool is lost elsewhere. In such a case, it is necessary to read the data again from the disk, which leads to the problem that the improvement of the throughput of the read processing is obstructed.

SUMMARY AND OBJECTS OF THE INVENTION

It is therefore an object of the invention to provide an asynchronous I/O control system which can improve the throughput of the input and output processing of the user programs.

It is another object of tile invention to provide an asynchronous I/O control system which is capable of executing input and output processing that reflects the priority of the user program.

It is still another object of the invention to provide an asynchronous I/O control system in which the user program can efficiently utilize the input and output buffer irrespective of its priority.

One aspect of the asynchronous I/O control system according to the invention, is as follows:

In a data processing system which carries out a parallel processing of a plurality of user programs having different processing priorities, and which asynchronously executes the processing of storing in a buffer data requested by a user program to be written in an external storage device, and the processing of taking the data out of the buffer and writing it to the external storage device, there is provided
a control program that receives the data requested by the user program to be written to the external storage device, stores the data in the buffer, and delivers information on the data stored in the buffer to an asynchronous I/O execution task having the same execution priority as the execution priority attached to the user program. The asynchronous I/C) execution task reads the data from the buffer based on the information on the data stored in the buffer delivered from the control program and writes the data to the external storage device, then releases the buffer which was storing the data.

Another aspect of the asynchronous I/O control system according to the invention, is as follows:

In a data processing system which carries out a parallel processing of a plurality of user programs having different processing priorities, and which asynchronously executes the processing of storing in a buffer data requested by a user program to be written to an external storage device, and the processing of taking the data out of the buffer and writing it to the external storage device, there is provided
a user program group that comprises a plurality of the user programs given a variety of execution priorities which request writing of data to the external storage device, an asynchronous I/O buffer group that comprises a plurality of the buffers for storing the data, a buffer management table that stores information on the usage conditions of the buffers in the asynchronous I/0 buffer group, an asynchronous I/0 execution task group comprising a plurality of asynchronous I/0 execution tasks given a variety of execution priorities which read the data from the buffers in the asynchronous I/0 buffer group, and write them to the external storage device, an asynchronous I/0 execution task management table that stores information on the execution conditions of the asynchronous I/0 execution task group, a control program that receives the data requested by the user program to be written to the external storage device, secures in the asynchronous I/C) buffer group a buffer for storing the data by referring to the buffer management table, stores the data in the buffer, secures in the asynchronous I/0 execution task group an asynchronous I/0 execution task having an execution priority the same as the priority attached to the use program by referring to the asynchronous I/0 execution task management table, delivers information on the data stored in the buffer within the asynchronous I/0 buffer group to the asynchronous I/0 execution task, and brings the asynchronous I/0 execution task to executable status; and wherein the asynchronous I/0 execution task reads the data stored in the buffer within the asynchronous I/0 buffer group based on the information delivered from the control program on the data stored in the buffer within the asynchronous I/O buffer group, writes the data to the external storage device, and then releases the buffer within the asynchronous I/O buffer group which was storing the data.

BRIEF DESCRIPTION OF THE DRAWINGS

The above and other features, functions and effects of this invention will become more apparent by reference to the following description taken in conjunction with the accompanying drawings, wherein.

In the drawings, the same reference numeral indicates the same component.

DETAILED DESCRIPTION OF PREFERRED EMBODIMENTS

Referring to the accompanying drawings, an embodiment of the invention will be described in detail.

Figures 1, 2:
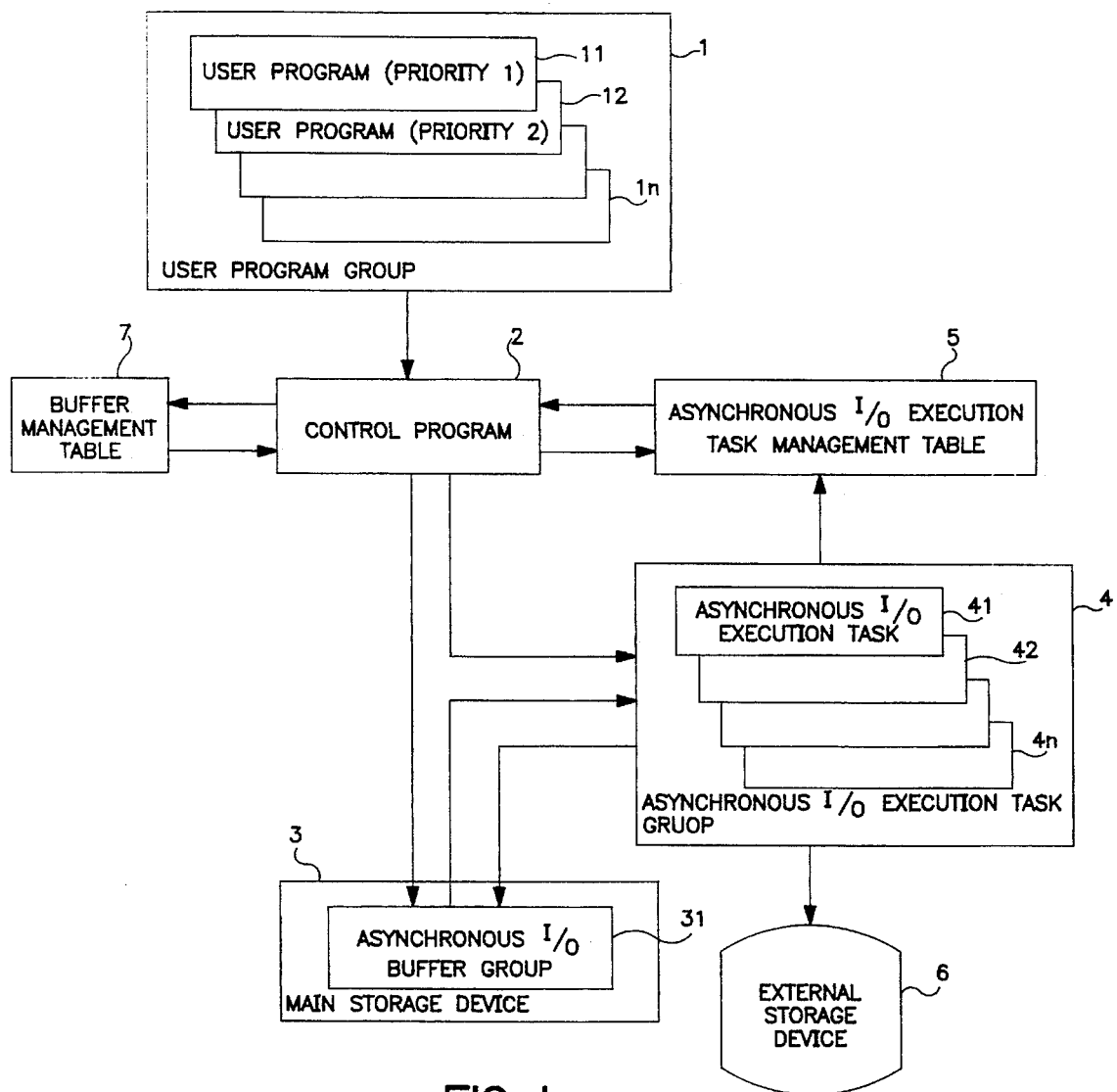
FIG. 1 is a block diagram showing an embodiment of the invention.
FIG. 2 is a diagram showing the contents of the asynchronous I/O execution task management table in an embodiment of the invention.

Referring to FIG. 1, the asynchronous I/O control system which is an embodiment of the invention is comprised of a user program group 1 which includes a plurality of user programs 11 to 1n having a variety of execution priorities assigned to them, a control program 2 which receives data from the user programs 11–1n and controls the write processing of the data to an external storage device 6, a main storage device 3 in which is established an asynchronous I/O buffer group 31 which includes a plurality of buffers for storing data received by the control program from the user programs 11–1n, a buffer management table 7 which stores information on the usage conditions of buffers in the asynchronous I/O buffer group, an asynchronous I/O execution task group 4 including a plurality of asynchronous I/O execution tasks 41 to 4n which write to the external storage device 6 the data generated by the control program 2 and stored in buffers of the asynchronous I/O buffer group 31, and an asynchronous I/O execution task management table 5 which stores information on the execution conditions of the asynchronous I/O execution task group 4.

Referring to FIG. 2, the asynchronous I/O execution task management table 5 is a table which manages the set of an address field showing the address of the asynchronous I/O execution task 4n and a task status flag showing the status of the task. When the value of the task status flag is 1, this indicates that the task is in the condition that can be activated or is under activation, while a value of 0 indicates that the task is in the standby condition.

Next, referring to FIG. 1 to FIG. 3, the asynchronous I/O control system which is an embodiment of the invention will be described in detail.

In this embodiment, it will be assumed that the block size of data to be written requested by a user program 1n within the user program group 1 is fixed, and that the buffer table 7 stores the location and the number of buffers in active use and the location and the number of vacant buffers as information as to the usage conditions of the asynchronous I/O buffer group 31.

Figure 3:
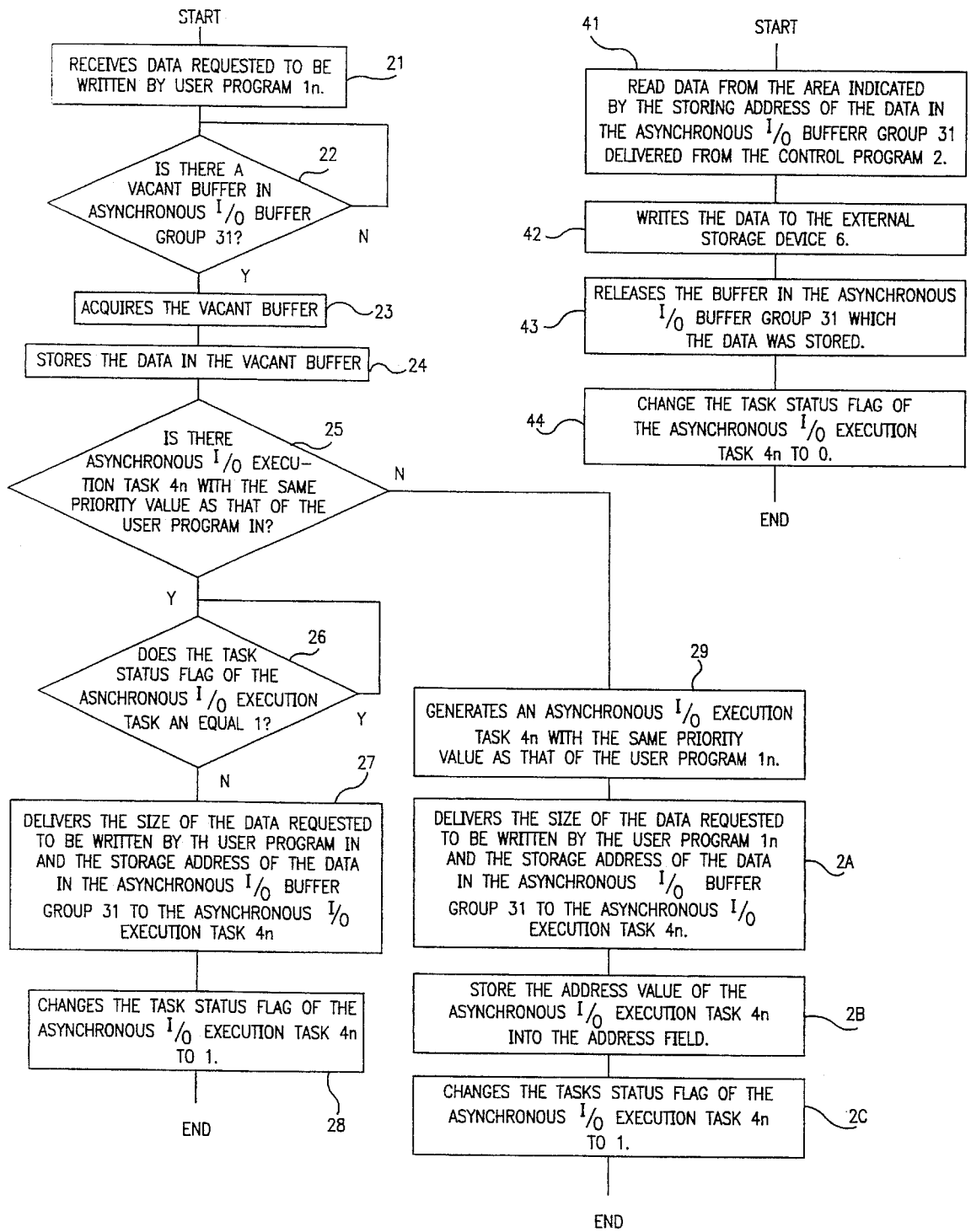
FIG. 3 shows flow charts indicating the processing of the control program and the asynchronous I/O execution task in an embodiment of the invention.

When data write is requested by user program 1n within the user program group 1, the control program 2 first receives data from the user program 1n (step 21 in FIG. 3).

Next, the control program 2 judges where there exists a vacant buffer capable of storing the data in the asynchronous I/O buffer group 31 (step 22), and if there exists a vacant buffer, the vacant buffer is acquired (step 23), and the data is stored in the acquired vacant buffer (step 24). If it was not possible in step 22 to acquire a vacant buffer to store the data, the control program 2 goes to a buffer waiting state, and executes again step 22 after a certain period of time.

The buffer within the asynchronous I/O buffer group 31 is released when the asynchronous I/O execution task 4n writes the data to the external storage device, or when access was not available within a certain time, the virtual storage control of the operating system is released, so that the control program 2 in the buffer waiting state will be able to acquire a buffer quickly, depending on the number of buffers.

In a computer system in which the block size of the data requested by the user program 1n within the user program group 1 is variable, the size of all areas of the asynchronous I/O buffer group 31 and the starting address and the final address of the areas in active use are stored in the buffer management table 7. Namely, in the vacant buffer acquisition processing in step 22 and step 23, it is judged whether an area necessary for storing the data can be secured as a vacant buffer from the unused areas within the asynchronous I/O buffer group 31 by referring to the information in the buffer management table 7 depending upon the block size and the block number of the data. When it is judged that a vacant buffer can be secured, a processing for securing the area as a vacant buffer is executed.

Next, the control program 2 determines whether there already exists an asynchronous I/O execution task 4n having a priority the same as the priority of the user program 1n requesting the data write, by examining whether there exists an address of the asynchronous I/O task 4n having the same priority in the address field of the asynchronous I/O execution task management table 5 (Step 25). When there exists an address in the address field, it is determined whether the task status flag of the asynchronous I/O execution task 4n is activated, that is, whether the flag has a value of 1 (Step 26). When the task flag is 1, it shows that the asynchronous I/O execution task 4n is waiting to write or is writing data stored previously in a buffer within the asynchronous I/O buffer group 31, so that Step 26 is executed again after a certain period of time.

When the task flag status in Step 26 is judged to be in the waiting state, namely, it displays 0, the control program 2 delivers the size of the data requested to be written by the user program 1n and the storage address of the data within the asynchronous I/O buffer group 31 to the asynchronous I/O execution task 4n indicated by the address stored in the address field (Step 27), and changes the task status flag of the asynchronous I/O execution task 4n of the asynchronous I/O execution task management table 5 to a flag indicating that it is active, namely, a value of 1 (Step 28), thereby completing the processing.

When the control program judges in Step 25 that there did not exist an asynchronous I/O execution task 4n having a priority the same as the priority of the user program 1n requesting data write, namely, when there did not exist an address of an asynchronous I/O execution task 4n having the same priority in the address field of the asynchronous I/O execution task management table 5, the control program 2 generates an asynchronous I/O execution task 4n with a priority the same as that of the user program 1n (Step 29), delivers to the asynchronous I/O execution task 4n the size of the data requested to be written by the user program 1n and the storage address of the data within the asynchronous I/O buffer group 31 (Step 2A), stores in the address value of the generated asynchronous I/O execution task 4n in the address field of the asynchronous I/O execution task management table 5 (Step 2B), and changes the task status flag to that indicating that it is active, namely, a value of 1 (Step 2C), thereby completing the processing.

Thereafter, the task satus flag in the asynchronous I/O execution task management table 5 of the asynchronous I/O execution task 4n is changed from that of the standby state to that of the active state, namely, from 0 to 1, indicating that the asynchronous I/O execution task 4n takes out data, corresponding to the size of the data delivered by the control program 2, from the area indicated by the storage address of the data within the asynchronous I/O buffer group 31 delivered by the control program 2 (Step 41), and writes the data taken out to the external storage device (Step 42).

After completion of Step 42, the asynchronous I/O execution task 4n releases the buffer within the asynchronous I/O buffer group 31 which was storing the data (Step 43), and changes the task status flag of the asynchronous I/O execution task 4n of the asynchronous I/O execution task management table 5 to that of the standby state, namely, 0 (Step 44), thereby completing the processing.

The processing by the asynchronous I/O control system according to an embodiment of this invention is thus completed as described above.

An important feature of the asynchronous I/O control system according to the embodiment of the invention is that, asynchronously with the storing within the asynchronous I/O buffer group 31 by the control program 2 of data requested to be written by a user program 1n, an asynchronous I/O execution task 4n having the same priority as that of the user program 1 n takes out the data stored in the asynchronous I/O buffer group 31, and writes the data to the external storage device 6.

As described above, the asynchronous I/0 control system of this embodiment of the invention has an effect that the throughput of the user programs including the input and output processing can be improved sufficiently corresponding to the priority, by executing the input and output processing of the user program 1n using an asynchronous I/O execution task 4n having an identical priority as the priority of the user program 1n.

Moreover, in the asynchronous I/O control system of this embodiment of the invention, data requested to be written by user programs and stored within the asynchronous I/O buffer group 31 by the control program 2 are written sequentially to the external storage device 6 by asynchronous I/O execution tasks having priorities identical to the priorities of respective user programs, so that there will occur no residence of data within the asynchronous I/O buffer group 31.

As a result, here will be no shortage of the asynchronous I/O buffers, and the system thereby has a further advantage in that the user programs can efficiently use the I/O buffer group 31 regardless of their priorities.

As described above, this system therefore has an overall effect of providing an asynchronous I/O control system which can efficiently improve the input and output processing of the user programs.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. In a data processing system for carrying out a parallel processing of a plurality of user programs having different processing priorities, an asynchronous input and output control system which asynchronously executes the processing of storing in a buffer data requested by a user program to be written to an external storage device and the processing of taking the data out of the buffer and writing the data to the external storage device, said control system comprising:

a control program comprising means for receiving said data requested by said user program to be written to said external storage device, means for storing the data to said buffer, and means for delivering information on said data stored in said buffer to an asynchronous input and output execution task having an execution priority identical to the execution priority assigned to said user program by the user, means for generating said asynchronous input and output execution task of identical execution priority if no input and output execution task having an execution priority identical to the execution priority assigned to said user program exists; and said asynchronous input and output execution task having said priority comprising means for reading said data from said buffer based on the information on the data stored in said buffer delivered from said control program, means for writing said data to said external storage device, and means for releasing said buffer which was storing said data, said reading, writing and releasing means being actuated depending on said priority of said asynchronous input and output execution task.

2. In a data processing system for carrying out a parallel processing of a plurality of user programs having different processing priorities, as asynchronous input and output control system which asynchronously executes the processing of storing in a buffer data requested by a user program to be written to an external storage device and the processing of taking the data out of the buffer and writing the data to the external storage device, said control system comprising:

a user program group comprising a plurality of said user programs provided with a variety of execution priorities which carry out data write to said external storage device;

an asynchronous input and output buffer group comprising a plurality of said buffers for storing said data;

a buffer management table storing information on usage conditions of said buffers within the asynchronous input and output buffer group;

an asynchronous input and output execution task group comprising a same number of asynchronous input and output execution tasks as a number of execution priorities of said user programs, said asynchronous input and output execution tasks being provided with a variety of execution priorities which take out said data from said buffers in said asynchronous input and output buffer group and write said data to said external storage device;

an asynchronous input and output execution task management table storing information on execution conditions of the asynchronous input and output execution task group;

a control program comprising means for receiving from said user program said data requested to be written to said external storage device, and securing a buffer for storing said data within said asynchronous input and output buffer group by referring to said buffer management table, means for storing said data in a secured buffer, means for securing within said asynchronous input and output execution task group an asynchronous input and output execution task provided with an execution priority identical to an execution priority assigned to said user program by referring to said asynchronous input and output execution task management table, means for generating said asynchronous input and output execution task of identical execution priority if no input and output execution task having an execution priority identical to the execution priority assigned to said user program exists, means for delivering information on said data stored in said buffer within said asynchronous input and output buffer group to said asynchronous input and output execution task, and means for changing said asynchronous input and output execution task to an executable state; and said asynchronous input and output execution task comprising means for reading said data from said buffer within said asynchronous input and output buffer group based on the information on said data stored in said buffer within said asynchronous input and output buffer group, means for writing said data to said external storage device, and means for releasing said buffer within said asynchronous input and output buffer group which was storing said data.

3. In a data processing system for carrying out a parallel processing of a plurality of user programs having different processing priorities, an asynchronous input and output control system which asynchronously executes processing of storing in a buffer data requested by a user program to be written to an external storage device and processing of taking the data out of the buffer and writing the data to the external storage device, said control system comprising:

a user program group comprising a plurality of said user programs provided with a variety of execution priorities for requesting data write to said external storage device;

an asynchronous input and output buffer group comprising a plurality of said buffers for storing said data;

a buffer management table storing information on usage conditions of said buffers within the asynchronous input and output buffer group;

an asynchronous input and output execution task group comprising a same number of asynchronous input and output execution tasks as a number of execution priorities of said user programs, said asynchronous input and output execution tasks being provided with a variety of execution priorities which take out said data from said buffers within said asynchronous input and output buffer group and write the data to said external storage device;

an asynchronous input and output execution task management table storing information on execution conditions of the asynchronous input and output execution task group;

a control program comprising a data acquisition means for receiving said data requested by said user program to be written to said external storage device, a buffer securing means for securing a buffer within said asynchronous input and Output buffer group for storing said data acquired in the data acquisition means by referring to said buffer management table, a data storage means for storing said data acquired in said data acquisition means in said buffer secured in the buffer securing means, an asynchronous input and output execution task securing means for securing an asynchronous input and output execution task provided with an execution priority identical to the execution priority assigned to said user program by referring to said asynchronous input and output execution task management table, means for generating said asynchronous input and output execution task of identical execution priority if no input and output execution task having an execution priority identical to the execution priority assigned to said user program exists, and an asynchronous input and output execution task activation means for delivering information on said data stored in said buffer within said input and output buffer group in said data storage means to said asynchronous input and output execution task secured in the asynchronous input and output execution task securing means and bringing said asynchronous input and output execution task to an executable state; and said asynchronous input and output execution task comprising a data read means for reading said data from said buffer within said asynchronous input and output buffer group based on the information on said data stored in said buffer within said asynchronous input and output buffer group delivered by said control program, a data write means for writing said data taken out in the data take out step to said external storage device, and a buffer releasing means for releasing said buffer that was storing said data within said asynchronous input and output buffer group.

4. The asynchronous input and output control system as claimed in claim 3, wherein said asynchronous input and output execution task management table sets up an address field which shows the address where said asynchronous input and output execution task exists and a task status flag which shows the status of said asynchronous input and output execution task, for every asynchronous input and output execution task of different execution priority, as information on the execution conditions of said asynchronous input and output execution task group.

5. The asynchronous input and output control system as claimed in claim 4, wherein said asynchronous input and output execution task securing means of said control program comprises an asynchronous input and output execution task decision means for determining whether there exists an asynchronous input and output execution task provided with an execution priority identical to the execution priority assigned to said user program by referring to the information in said asynchronous input and output execution task management table.

6. The asynchronous input and output control system as claimed in claim 3, wherein said asynchronous input and output execution task management table sets up an address field which shows the address where said asynchronous input and output execution task exists and a task status flag which shows the status of said asynchronous input and output execution task, for every asynchronous input and output execution task of different execution priority, as information on the execution conditions of said asynchronous input and output execution task group.

7. The asynchronous input and output control system as claimed in claim 6, wherein said asynchronous input and output execution task securing means of said control program comprises an asynchronous input and output execution task decision means for determining whether there exists an asynchronous input and output execution task provided with an execution priority identical to the execution priority assigned to said user program by referring to the information in said asynchronous input and output execution task management table, and an asynchronous input and output execution task generating means for generating an asynchronous input and output execution task provided with the execution priority assigned to said user program when the asynchronous input and output execution task decision means determines that there did not exist an asynchronous input and output execution task provided with an execution priority identical to the execution priority assigned to said user program.

8. In a data processing system for carrying out a parallel processing of a plurality of user programs having different processing priorities, an asynchronous input and output control system which asynchronously executes processing of storing in a buffer data requested by a user program to be written to an external storage device and processing of taking the data out of the buffer and writing the data to the external storage device, said control system comprising:

a user program group comprising a plurality of said user programs provided with a variety of execution priorities for requesting data write to said external device;

an asynchronous input and output buffer group comprising a plurality of said buffers for storing said data;

a buffer management table storing a location and number of buffers in active use and the location and the number of idle buffers as information on usage conditions of said buffers within said asynchronous input and output buffer group;

an asynchronous input and output execution task group comprising a plurality of asynchronous input and output execution tasks provided with a variety of execution priorities which take out said data from said buffers within said asynchronous input and output buffer group and write the data to said external storage device;

an asynchronous input and output execution task management table storing information on execution conditions of the asynchronous input and output task group;

a control program comprising a data acquisition means from receiving said data requested by said user program to be written to said external storage device, a buffer securing means comprising a vacant buffer decision means for determining whether there exists vacant buffers within said asynchronous input and output buffer group by referring to said buffer management table and a vacant buffer acquisition means for acquiring the vacant buffer when the vacant buffer decision means determine that there exists a vacant buffer within said asynchronous input and output buffer group, a data storage means for storing said data acquired in said data acquisition means in said buffer secured in the buffer securing means, and an asynchronous input and output execution task securing means for securing an asynchronous input and output execution task provided with an execution priority identical to the execution priority assigned to said user program by referring to said asynchronous input and output execution task management table, means for generating said synchronous input and output execution task of identical execution priority if no input and output execution task having an execution priority identical to the execution priority assigned to said user program exists, and an asynchronous input and output execution task activation means for delivering information on said data stored in said buffer within said input and output buffer group in said data storage means to said asynchronous input and output execution task secured in the asynchronous input and output execution task securing means and for brinqing said asynchronous input and output execution task to an execution state; and said asynchronous input and output execution task comprising a data read means for reading said data from said buffer within said asynchronous input and output buffer group based on the information on said data stored in said buffer within said asynchronous input and output buffer group delivered by said control program, a data write means for writing said data taken out in the data take out step to said external storage device, and a buffer releasing means for releasing said buffer that was storing said data within said asynchronous input and output buffer group.

9. In a data processing system for carrying out a parallel processing of a plurality of user programs having different processing priorities, an asynchronous input and output control system which asynchronously executes processing of storing in a buffer data requested by a user program to be written to an external storage device and processing of taking the data out of the buffer and writing the data to the external storage device, said control system comprising:

a user program group comprising a plurality of said user programs provided with a variety of execution priorities for requesting data write to said external storage device;

an asynchronous input and output buffer group comprising a plurality of said buffers for storing said data;

a buffer management table storing a size of all areas and start address and final address of areas in active use in said asynchronous input and output buffer group as information on usage conditions of said buffers within said asynchronous input and output buffer group;

an asynchronous input and output execution task group comprising a plurality of asynchronous input and output execution tasks provided with a variety of execution priorities which take out said data from said buffers within said asynchronous input and output buffer group and write the data to said external storage device;

an asynchronous input and output execution task management table storing information on execution conditions of the asynchronous input and output execution task group;

a control program comprising a data acquisition means for receiving said data requested by said user program to be written to said external storage device, a buffer securing means comprising a vacant buffer decision means for determining whether it is possible to secure as a vacant buffer an area necessary for storing said data from among unused areas within said asynchronous input and output buffer group by referring to the information in said buffer management table corresponding to the block size and the block number of said data requested to be written by said user program, and a vacant buffer acquisition means for acquiring an area as a vacant buffer when the vacant buffer decision means determine that is it possible to secure an area necessary for storing said data as a vacant buffer within said asynchronous input and output buffer group, a data storage means for storing said data acquired in said data acquisition means in said buffer secured in the buffer securing means, an asynchronous input and output execution task securing means for securing an asynchronous input and output execution task provided with an execution priority identical to the execution priority assigned to said user program by referring to said asynchronous input and output task management table, means for generating said asynchronous input and output execution task of identical execution priority if no input and output execution task having an execution priority identical to the execution priority assigned to said user program exists, and an asynchronous input and output execution task activation means for delivering information on said data stored in said buffer within said input and output buffer group in said data storage means to said asynchronous input and output execution task secured in the asynchronous input and output execution task securing means and for bringing said asynchronous input and output execution task to an executable state; and said asynchronous input and output execution task comprising a data read means for reading said data from said buffer within said asynchronous input and output buffer group based on the information on said data stored in said buffer within said asynchronous input and output buffer group delivered by said control program, a data write means for writing said data taken out in the data take out step to said external storage device, and a buffer releasing means for releasing said buffer that was storing said data within said asynchronous input and output buffer group.

* * * * *